Sept. 3, 1957      K. A. BERGSTEDT      2,804,779
COMBINED REVERSING AND SPEED REDUCTION GEAR
Filed Oct. 31, 1955
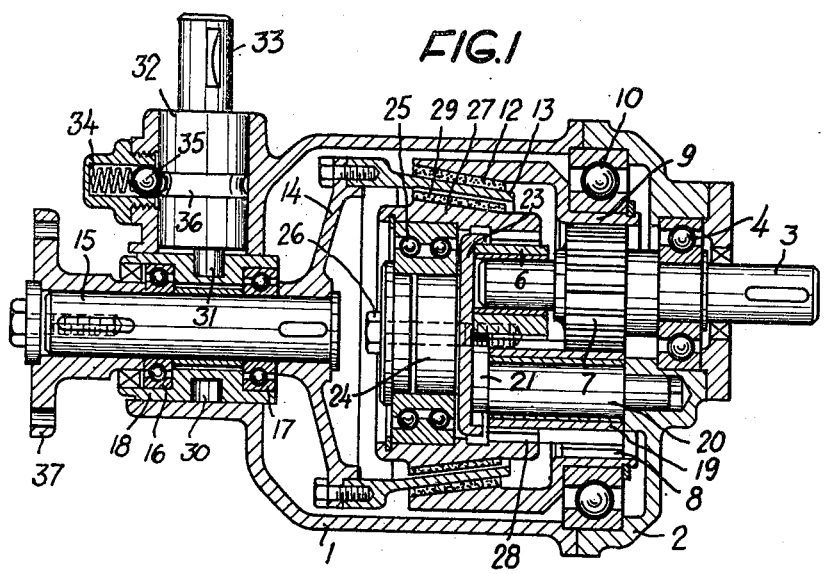
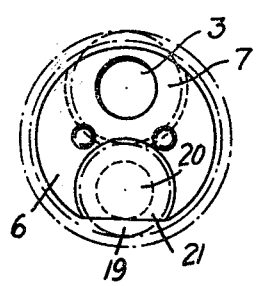
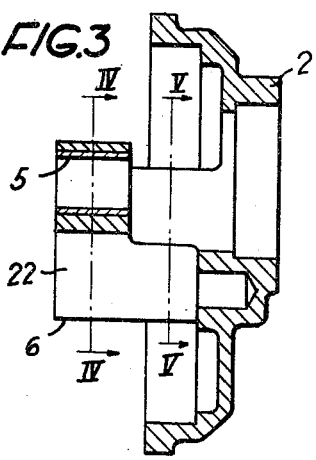
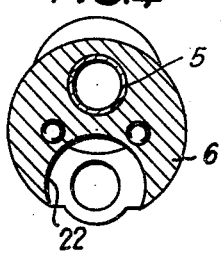
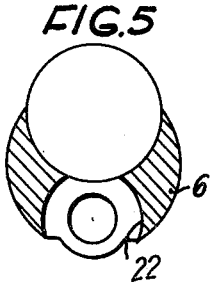
INVENTOR.
Karl Abdon Bergstedt
BY
Pierce, Scheffler & Parker
att'ys

United States Patent Office 2,804,779
Patented Sept. 3, 1957

2,804,779

COMBINED REVERSING AND SPEED REDUCTION GEAR

Karl Abdon Bergstedt, Goteborg, Sweden

Application October 31, 1955, Serial No. 543,799

4 Claims. (Cl. 74—355)

This invention relates to a combined reversing and speed reduction gear, particularly of the type to be used with modern high-speed engines for the propulsion of vessels. The object of the invention is to provide a simple construction in which the various parts of the gear are arranged in a manner such that the input shaft and the output shaft of the gear are only slightly displaced laterally relative each other such that the entire gear may be arranged within a very limited space.

I attain this object by mechanism described hereinbelow with reference to the annexed drawing in which: Fig. 1 is a longitudinal sectional view of a combined reversing and speed reduction gear, Fig. 2 an end view of a part of the gear, Fig. 3 a sectional view of part of the casing of the gear, Fig. 4 a section on line IV—IV of Fig. 3, and Fig. 5 a section on line V—V, Fig. 3.

Referring to the drawing, the casing 1 of the gear has a detachably connected end wall 2 in which an engine-driven input shaft 3 is mounted in a ball bearing 4 and a journal bearing 5 (Fig. 3), the last named bearing being provided in an inwardly projecting part 6 integral with the end wall 2. Between the bearings a pinion 7 is mounted on the input shaft 3, said pinion being in permanent engagement with an internally toothed rim 8 on a ring 9 which is externally mounted in a ball bearing 10 supported by the casing 1. The ring 9 has an axially projecting flange 11 which on the inside of its free end is conically shaped and has a frictional coating 12 for engagement with the outer face of a correspondingly shaped conical ring 13 which is connected to a disc 14 mounted on the output shaft 15 which projects outside the casing 1. Shaft 15 is mounted in bearings 16 and 17 supported by a sleeve 18 which is axially displaceable relative to the casing and the purpose of which will be described later on.

The pinion 7 on the input shaft 3 also permanently meshes with an intermediate gear wheel 19 which is mounted for free rotation on a shaft 20 one end of which is non-rotatably mounted in a recess in the end wall 2. The other end 21 of shaft 20 is disc-shaped and has a greater diameter than the intermediate gear wheel 19. The disc 21 fits an axial recess 22 for the wheel 19, said recess being provided in the part 6 of the end wall 2. The end of part 6 is closed by a cover 23 having an external stud 24 which supports an angular contact ball bearing 25. By means of bolts 26, the cover 23 and the stud 24 are secured to the part 6. The outer race of the bearing 25 is non-rotatably inserted into a ring 27, which axially extends over part of the width of the intermediate gear wheel 19 and has an internally toothed rim 28 in engagement with the intermediate wheel 19. The ring 27 has an external conical face in opposite relation to the conical face of the flange 11 and is provided with a frictional coating 29 for engagement with the inner face of the correspondingly shaped conical ring 13. The numbers of teeth of the interengaging gear wheels are chosen such that the rims 8 and 28 are coaxial but axially displaced relative each other and that the pinion 7 engages the rim 8 at a place diametrically opposite the place where the intermeditae gear wheel 19 engages the toothed rim 28.

The sleeve 18 has an external annular groove 30 engaged by a stud 31 which projects from the lower end face of a gear shift member 32 mounted for turning movement in the casing 1. The stud 31 is located excentrically with respect to the axis of the gear shift member. At the other end of the gear shift member there is provided a projecting part 33 for a gear shift lever (not shown). The gear shift member 32 is yieldingly retained in a neutral position by means of a ball 35 loaded by a spring 34, said ball engaging an external recess 36 of the gear shift member 32.

The end of the output shaft 15 projecting outside the casing 1 has secured thereto a flange 37 adapted to be connected with a propeller shaft or the like.

The mode of operation is as follows.

If the input shaft 3 is driven by a motor connected thereto, the toothed rims 8 and 28 will rotate at reduced speeds and in opposite directions. When the gear shift member 32 is turned in a direction such that the sleeve 18 and the output shaft 15 are moved towards the right as viewed in Fig. 1, the external face of the ring 13 will be brought into engagement with the frictional coating 12 on the flange 11 and, as a result, the output shaft 15 will be rotated in a certain direction. In this case, the propeller connected to shaft 15 is assumed to move the vessel ahead, the thrust maintaining the conical clutch 11, 12, 13 in engagement without the necessity of other locking means.

If the gear shift member 32 is turned in a direction such that the sleeve 18 and the output shaft 15 are displaced to the left as viewed in Fig. 1, the inner face of the ring 13 will engage the coating 29 on the ring 27. Consequently, the direction of rotation of the output shaft 15 will be reversed, and the vessel will move backwards. In this case, the pull exerted by the propeller will keep the clutch 13, 27, 29 in engagement without any special locking means.

It will be understood that the invention is not limited to the form of construction described. For instance, the input shaft 3 may be an elongated part of a motor shaft, in which case either of the bearings 4 or 5 may be omitted. Further, it is possible to mount the ring 27 on the inner face of the flange 11 and to omit the bearing 25. The conical clutches illustrated may be replaced by expansion or disc clutches. The clutches may be operated hydraulically, in which case the manually operated gear shift device may be used for emergency. The teeth of the gear wheels may be straight or spiral-shaped. Still further modifications are possible within the scope of the appending claims.

What I claim is:

1. In a combined reversing and speed reduction gear, an input shaft, an output shaft, a pinion mounted on said input shaft, a first gear wheel having an internally toothed rim in direct meshing engagement with said pinion, a second gear wheel having an internally toothed rim, an intermediate gear wheel in meshing engagement with said pinion and said second gear wheel, and means for alternative engagement of said first or second gear wheel with the output shaft.

2. In a combined reversing and speed reduction gear, an input shaft, an output shaft, a pinion mounted on said input shaft, a first gear wheel having an internally toothed rim in direct meshing engagement with said pinion, a second gear wheel having an internally toothed rim, an intermediate gear wheel in meshing engagement with said pinion and said second gear wheel, said toothed rims being arranged coaxially and axially displaced relative each other and having flanges overlapping each other and located concentrically with respect to each other, the inner face of the outer flange and the outer face of the inner flange being conical and having frictional coatings, a conical ring disposed between the conical faces of the flanges and connected with the output shaft, and means for displacing said conical ring axially in either direction to engage the ring with either of said flanges.

3. A combined reversing and speed reduction gear, comprising a casing including an end wall and a part projecting inwardly from the end wall, an input shaft extending into the casing, an output shaft projecting from the casing, a pinion mounted on said input shaft, a first gear wheel mounted in said casing and having an internally toothed rim in direct meshing engagement with said pinion, a second gear wheel having an internally toothed rim and mounted on said inwardly projecting part, an intermediate gear wheel in meshing engagement with said pinion and said second gear wheel, and means for alternative engagement of said first or second gear wheel with the output shaft.

4. A combined reversing and speed reduction gear as set forth in claim 3 and further comprising an intermediate shaft having an enlarged end and having its opposite end supported in said end wall, the intermediate gear wheel being mounted on said last-named shaft, said inwardly projecting part having a cylindrical recess receiving the intermediate gear wheel and supporting said enlarged shaft end.

References Cited in the file of this patent
UNITED STATES PATENTS

| | | |
|---|---|---|
| 1,560,982 | Fornaca | Nov. 10, 1925 |
| 1,634,091 | Bethune et al. | June 28, 1927 |
| 1,783,533 | Carter | Dec. 2, 1930 |